US012675734B1

(12) United States Patent
Jahjah et al.

(10) Patent No.: US 12,675,734 B1
(45) Date of Patent: Jul. 7, 2026

(54) TECHNIQUES FOR CUSTOMIZING A MACHINE LEARNING MODEL FOR THE SOURCE DATA AND NEEDS OF A SPECIFIC USER

(71) Applicant: Bentley Systems, Incorporated, Exton, PA (US)

(72) Inventors: Karl-Alexandre Jahjah, Quebec City (CA); Kaustubh Page, Bee Cave, TX (US); Tautvydas Eidietis, Vilniaus (LT); Arnob Mallick, Austin, TX (US); Marc-André Lapointe, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 884 days.

(21) Appl. No.: 17/976,383

(22) Filed: Oct. 28, 2022

(51) Int. Cl.
*G06N 20/00* (2019.01)

(52) U.S. Cl.
CPC .................................... *G06N 20/00* (2019.01)

(58) Field of Classification Search
CPC .................................................... G06N 20/00
See application file for complete search history.

(56) References Cited

U.S. PATENT DOCUMENTS

| | | | | |
|---|---|---|---|---|
| 10,402,749 | B2 | 9/2019 | Aminzadeh et al. | |
| 11,036,483 | B2 * | 6/2021 | Veljanoski | G06F 8/71 |
| 11,348,032 | B1 * | 5/2022 | Van Gael | G06F 8/31 |
| 11,393,182 | B2 * | 7/2022 | Jacquot | G06V 10/40 |
| 11,449,797 | B1 * | 9/2022 | Kurniawan | G06N 20/00 |

| | | | | |
|---|---|---|---|---|
| 2007/0217796 | A1 * | 9/2007 | German | G03G 15/5062 |
| | | | | 399/9 |
| 2015/0242760 | A1 | 8/2015 | Miao et al. | |
| 2016/0055426 | A1 * | 2/2016 | Aminzadeh | G06N 7/01 |
| | | | | 706/12 |
| 2017/0185904 | A1 | 6/2017 | Padmanabhan et al. | |
| 2019/0120770 | A1 * | 4/2019 | Chen | G01B 11/303 |
| 2019/0228343 | A1 * | 7/2019 | Gu | G06N 20/00 |
| 2019/0318198 | A1 * | 10/2019 | Griffin | G10L 15/063 |
| 2020/0110590 | A1 * | 4/2020 | Lisuk | G06F 8/60 |
| 2020/0174840 | A1 * | 6/2020 | Zhao | G06N 3/084 |
| 2020/0184252 | A1 * | 6/2020 | Syeda-Mahmood | G06N 3/088 |
| 2020/0349469 | A1 * | 11/2020 | Katzenberger | G06F 16/24568 |
| 2020/0394044 | A1 * | 12/2020 | Keski-Valkama | G06F 9/3885 |

(Continued)

FOREIGN PATENT DOCUMENTS

EP 4339832 A1 * 3/2024 ............. G06N 20/20

OTHER PUBLICATIONS

Ali, "Write and train your own custom machine learning models using PyCaret," Apr. 26, 2021, https://medium.com/data-science/write-and-train-your-own-custom-machine-learning-models-using-pycaret-8fa76237374e.*

(Continued)

*Primary Examiner* — Ryan Barrett

(74) *Attorney, Agent, or Firm* — Cesari and McKenna, LLP; James A. Blanchette

(57) ABSTRACT

In example embodiments, techniques are provided for customizing a ML model for a specific user absent user-coding. The techniques may provide a "black box" service to the user where the intricacies of ML model training are abstracted, and the user simply provides source data and makes high level selections. The techniques may be used with a variety of types of ML model architectures and ML Pipelines.

20 Claims, 6 Drawing Sheets

(56) References Cited

U.S. PATENT DOCUMENTS

| | | | |
|---|---|---|---|
| 2021/0019665 A1* | 1/2021 | Gur | G06N 20/20 |
| 2021/0042168 A1* | 2/2021 | Bakulin | G06F 9/5038 |
| 2021/0117716 A1 | 4/2021 | Lapointe et al. | |
| 2021/0183036 A1* | 6/2021 | Gurudath | B41J 2/0451 |
| 2021/0216881 A1* | 7/2021 | McCarthy | G06N 3/042 |
| 2021/0241152 A1* | 8/2021 | Fong | G06N 20/00 |
| 2021/0249128 A1* | 8/2021 | Matveeva | G06N 5/02 |
| 2021/0256392 A1* | 8/2021 | Chen | G06N 3/006 |
| 2021/0279640 A1* | 9/2021 | Tu | G06V 10/764 |
| 2022/0067576 A1* | 3/2022 | Saha | G06N 20/00 |
| 2022/0188691 A1* | 6/2022 | Katz | G06N 20/00 |
| 2022/0261631 A1* | 8/2022 | Cohen | G06N 3/0895 |
| 2022/0269982 A1* | 8/2022 | Saha | G06N 20/00 |
| 2023/0168938 A1* | 6/2023 | Hirzel | G06N 20/00 |
| | | | 718/102 |
| 2023/0196178 A1* | 6/2023 | Herta | G06N 20/00 |
| | | | 718/102 |
| 2024/0104394 A1* | 3/2024 | Skerry-Ryan | G06N 3/08 |

OTHER PUBLICATIONS

Google, "Cloud AutoML," Mar. 19, 2020, https://web.archive.org/web/20200319235347/https://cloud.google.com/automl/.*
Google, "Teachable Machine," Mar. 2, 2021, https://web.archive.org/web/20210302075052/https://teachablemachine.withgoogle.com/.*
U.S. Appl. No. 17/522,496, filed Nov. 9, 2021 by Andre Villemaire et al. for Integrating Machine Learning Classification Models and Machine Learning Anomaly Models, pp. 1-41.
U.S. Appl. No. 17/954,694, filed Sep. 28, 2022 by Karl-Alexandre Jahjah et al. for Techniques for Labeling Elements of an Infrastructure Model With Classes, pp. 1-33.

* cited by examiner

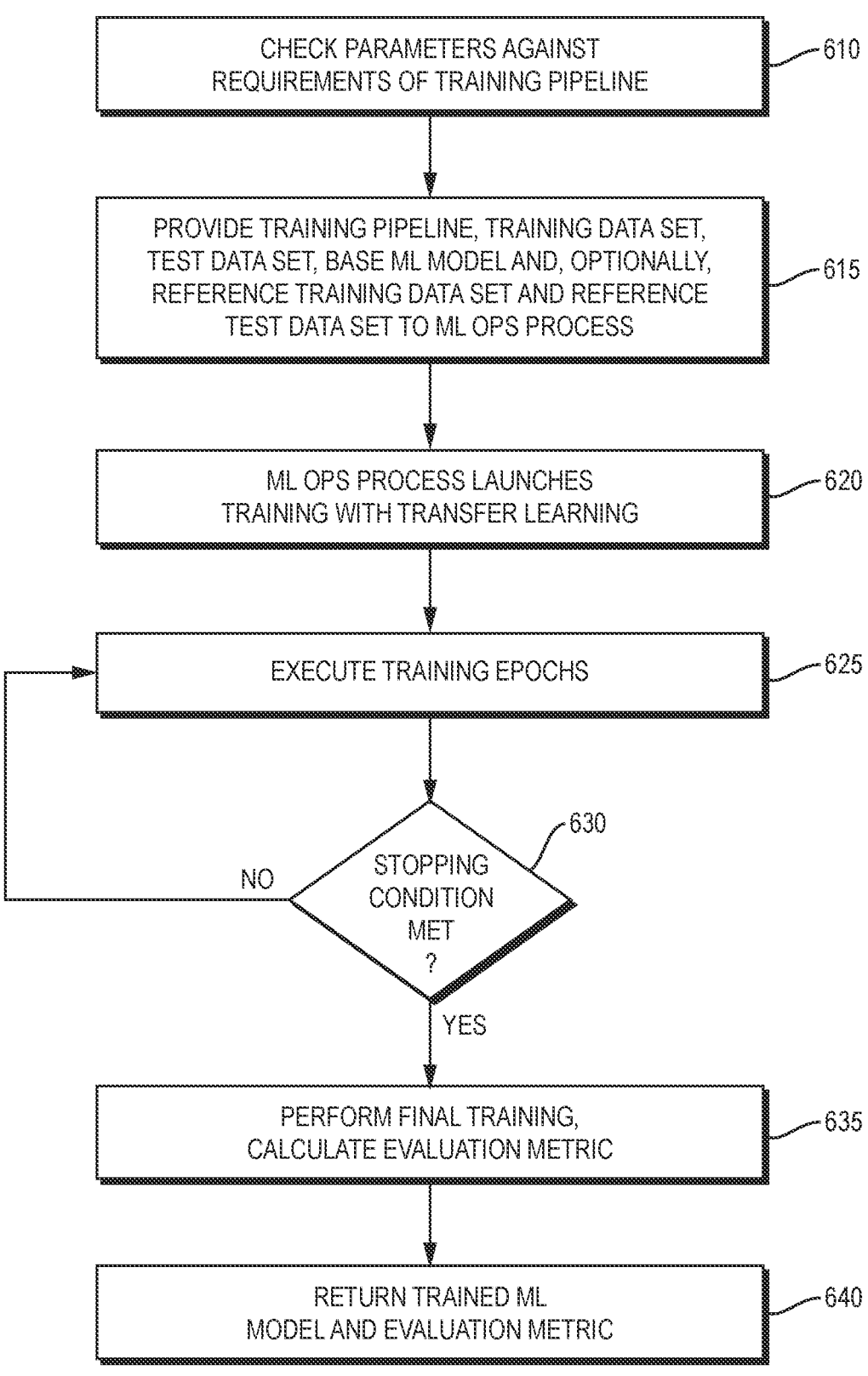

CHECK PARAMETERS AGAINST
REQUIREMENTS OF TRAINING PIPELINE ——610

PROVIDE TRAINING PIPELINE, TRAINING DATA SET,
TEST DATA SET, BASE ML MODEL AND, OPTIONALLY,
REFERENCE TRAINING DATA SET AND REFERENCE
TEST DATA SET TO ML OPS PROCESS ——615

ML OPS PROCESS LAUNCHES
TRAINING WITH TRANSFER LEARNING ——620

EXECUTE TRAINING EPOCHS ——625

STOPPING
CONDITION
MET
? ——630

NO

YES

PERFORM FINAL TRAINING,
CALCULATE EVALUATION METRIC ——635

RETURN TRAINED ML
MODEL AND EVALUATION METRIC ——640

FIG. 6

TECHNIQUES FOR CUSTOMIZING A MACHINE LEARNING MODEL FOR THE SOURCE DATA AND NEEDS OF A SPECIFIC USER

BACKGROUND

Technical Field

The present disclosure relates generally to training machine learning (ML) models and more specifically to techniques for customizing a ML model for the source data and needs of a specific user absent user-coding.

Background Information

In the design, construction and/or operation of infrastructure (e.g., buildings, factories, roads, railways, bridges, electrical and communication networks, equipment, etc.) it is often desirable to utilize ML models to perform detection, classification, and other tasks (collectively "ML tasks"). The ML models may take a variety of different forms, including geometry classification models, piping, and instrumentation diagram (P&ID) detection models, structural deficiency detection models, and image classification models, among others. Such ML models may operate on a variety of types of source data, including 1-dimensional (1-D) data (e.g., time series, lists of labels, etc.), 2-dimensional (2-D) data (e.g., 2-D drawings, tabular data, images, etc.), 3-dimensional (3-D) data (e.g., infrastructure models, point clouds, videos, etc.) and/or greater dimensional (3-D+) data (e.g., infrastructure models with time series data or construction sequencing data).

Often the ML models available to users (i.e., end customer organizations and their employees) have been developed and trained by a separate software development company using generic reference data available to the software development company. Such generic ML models may have learned the fundamentals of performing a certain ML task in a manner the software development company envisions may be useful to its customers. However, generic ML models typically will not perform optimally on specific user data because they have not been trained on that user's data or tailored to that user's particular needs. In addition, generic ML models typically will be limited to a generic sets of classes, while a specific user may be interested in additional or different classes. For example, a user may desire to split some classes of a generic set into multiple sub-classes. Further, generic ML models typically will be limited to the ML tasks the software development company envisioned useful to its customers, and decided to train them to perform (which may be limited by available training data). This may be a subset of the ML model's actual capabilities. For example, a ML model may be trained to detect cracks by a software development company using training data including images of infrastructure with and without cracks. Such ML model might have an appropriate model architecture to detect other type of defects that are relevant to a specific user, but may simply not be able to do so because the software development company did not provide it with appropriate training data (e.g., images of infrastructure with and without other types of defects).

It would be desirable to allow a specific user to easily customize a ML model for their own source data and needs. However, current techniques for training and re-training ML models generally require in depth knowledge of ML architectures and extensive coding. Often this is beyond the technical skills of the user. Accordingly, there is a need for techniques for customizing a ML model for the source data and needs of a specific user absent user-coding.

SUMMARY

In various embodiments, techniques are provided for customizing a ML model for the source data and needs of a specific user absent user-coding. The techniques may provide a "black box" service to the user where the intricacies of ML model training are abstracted, and the user simply provides source data and makes high level selections. The techniques may be used with a variety of types of ML model architectures and ML Pipelines.

In one embodiment, a ML model is customized for a specific user by first creating a DataSet for the user on a ML platform by building a BaseDataSet, determining one or more Task Definitions that are compatible with the Base-DataSet and selecting a Task Definition therefrom. A Label-Set is then created for the BaseDataSet. Thereafter, a Training Pipeline is selected from among provided Training Pipelines that are compatible with the Task Definition. The selected Training Pipeline is executed on the DataSet to train the ML model for the specific user and a customized trained ML model provided for use, all absent user coding.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which:

FIG. 6 is a flow diagram of an example sequence of steps that may be performed as part of FIG. 3 to execute a selected Training Pipeline to train a ML model with transfer learning from a base ML model.

DETAILED DESCRIPTION

Definitions

As used herein, the term "user" refers to an end customer organization and/or their employees who may utilize a ML model to perform a ML task. A "user" is contrasted with a software development company that is in the business of providing ML models to end customer organizations.

As used herein, the term "DataSet" refers to data used to train a ML model. A DataSet may combine one or more pairs of Base DataSets and LabelSets with a Task Definition.

As used herein, the term "Base DataSet" refers to a data structure that maintains a collection of source data for a ML task. A Base DataSet may contain a set of user files.

As used herein, the term "LabelSet" refers to a data structure that maintains a collection of labels for source data that provides ground truth for training and/or evaluating a ML model. A LabelSet may contain a collection of label files.

As used herein, the term "Task Definition" refers to a description of a ML task that a ML model is to accomplish (i.e., what it takes as input and what it provides as output). A Task Definition may encapsulate a data contract that specifies input and output data types.

As used herein, the term "ClassSet" refers to a data structure that maintains a collection of classes that can be predicted by a ML model. A ClassSet may contain individual classes that each describe one possible classification that may be predicted or one possible property that may be predicted.

As used herein, the term "snapshot" refers to a fixed-in-time representation of information. Snapshots may include a "ClassSet Snapshot" that is a fixed-in-time representation of a ClassSet, and a "DataSet Snapshot" that is a fixed-in-time representation of a DataSet.

As used herein, the term "Pipeline" refers to an executable workflow that can perform a ML task. Pipelines may include a "Training Pipeline" that refers to an executable workflow whose execution produces a trained ML model for a Task Definition. Pipelines may also include an "Inference Pipeline" (i.e., an executable workflow whose execution uses a trained ML model according to a Task Definition to perform inference). A data structure that maintains a record of an execution of a Training Pipeline is referred to herein as a "Training Pipeline Run." A data structure that maintains a record of an execution of a Prediction Pipeline is referred to herein as an "Inference Pipeline Run."

As used herein, the term "ReviewSet" refers to a data structure that maintains data produced by a trained ML model in inference. A ReviewSet may be a type of LabelSet that instead of a collection of label files includes a collection of prediction files that may be reviewed.

Example Embodiments

Figure 1:
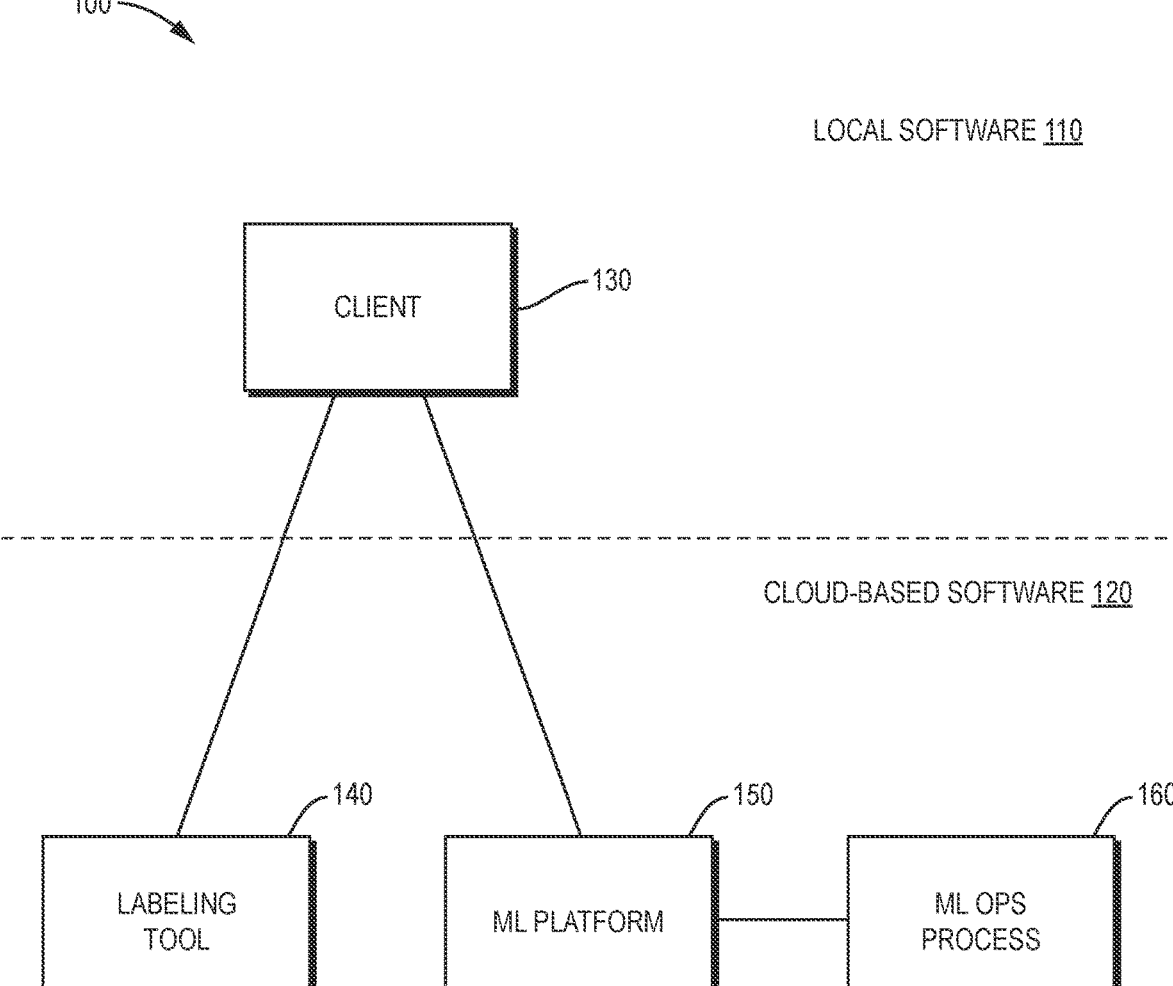
FIG. 1 is an example high-level software architecture.

FIG. 1 is an example high-level software architecture 100. The software may be divided into local software 110 that executes on one or more computing devices local to an end-user (collectively "local devices") and cloud-based software 120 that executes on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include a client 130 (e.g., a web application, a desktop application, etc.) that includes user interface functionality for managing customization of a ML model including uploading of source data of a user. The cloud-based software 120 may include a labeling tool 140, a ML platform 150 and a ML Operations (MLOps) process 160, among other software tools and processes. The labeling tool 140 may include functionality for creating and editing label files that indicate labels for source data. The ML platform 150 may include functionality for building and maintaining collections of source data as well as entities that describe aspects of training that may be performed to customize a ML model, such as the classes that may be predicted, tasks that may be accomplished, executable workflows that can be used, etc. The MLOps process 160 may be responsible for performing the actual training of a ML model, using the collections of source data and entities provide by the ML platform 150.

Figure 2:
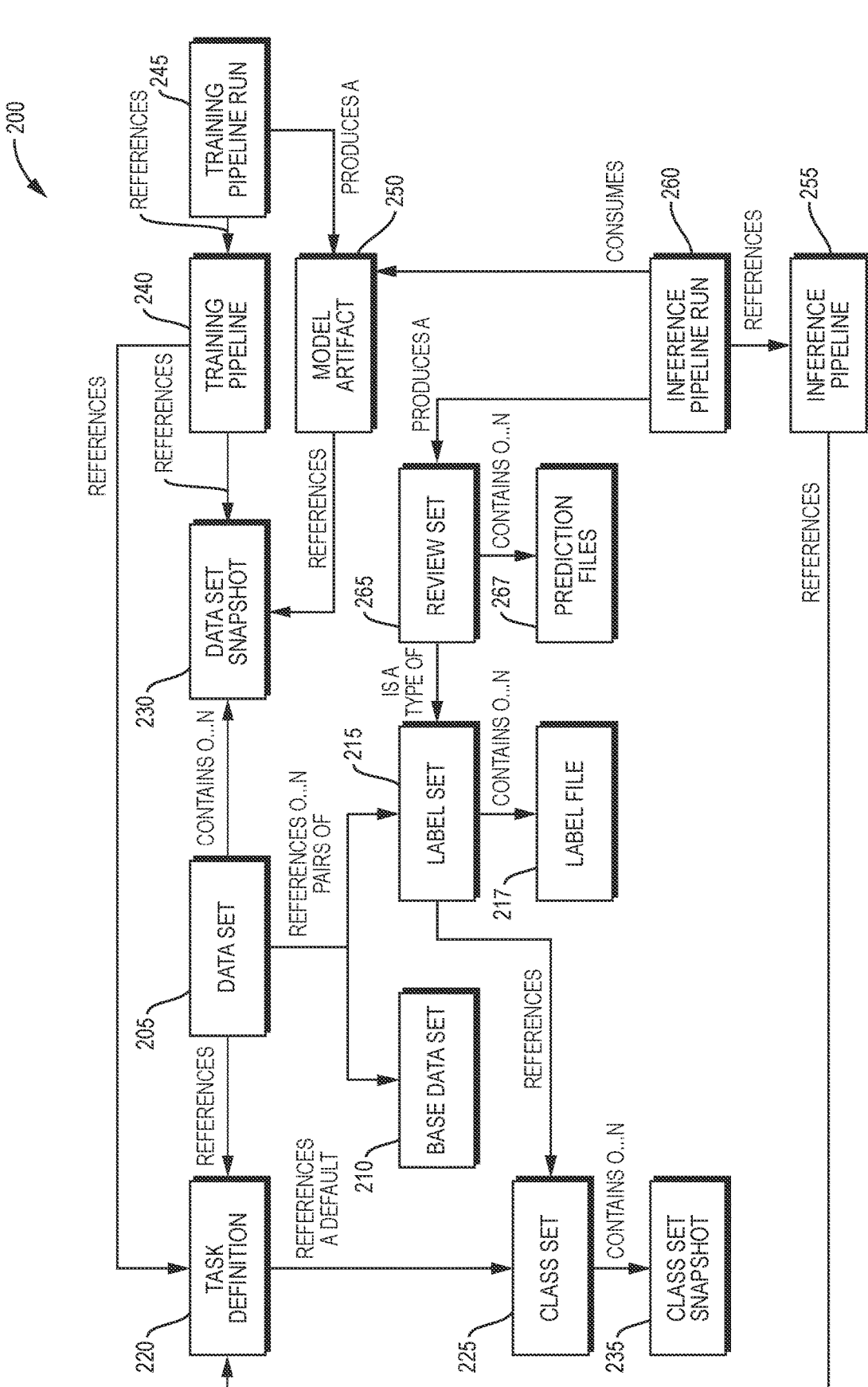
FIG. 2 is an example model of entities that may be used to customize a ML model for a specific user absent user-coding.

FIG. 2 is an example model 200 of entities that may be used to customize a ML model for a specific user absent user-coding. A DataSet 205 (i.e., a data structure that maintains a collection of source data for a ML task) may combine one or more pairs of BaseDataSets 210 and LabelSets 215 with a Task Definition 220. A DataSet 205 may simply reference these entities without duplicating data. Multiple DataSets 205 may be built that include the same BaseDataSet 210 by associating it with different LabelSets 215 and/or Task Definitions 220.

A Base DataSet 210 (i.e., a data structure that maintains a collection of source data for a ML task) may contain a set of user files that are the basis for customizing a ML model. User files are files or other data structures that include user-specific information. The user files may include 1-D data (e.g., time series, lists of labels, etc.), 2-D data (e e.g., 2-D drawings, tabular data, images, etc.), 3-D data (e.g., infrastructure models, point clouds, videos, etc.) and/or 3-D+data (e.g., infrastructure models with time series data or construction sequencing data). User files may change over time. Adding or subtracting user files, or updating content of the user files, may change a Base DataSet version and multiple versions may be maintained. A Base DataSet 210 may be associated with a datatype that describes the type of files it maintains, as well as additional parameters that describe the format of the information therein. For example, if the user files are image files, additional parameters may describe extensions (e.g., .png, .jpg, etc.), dimensions (e.g., in pixels), file sizes, numbers of channels, and the like.

A LabelSet 215 (i.e., a data structure that maintains a collection of labels for source data that provides ground truth for training and/or evaluating a ML model) may contain a set of label files 217. Label files 217 are files or other data structures that includes labels that provide ground truth. The labels may be selected from the classes of a ClassSet 225, and a LabelSet 215 may reference a ClassSet 225. Editing any of the label files 217 of a LabelSet 215, or adding or subtracting label files 217 of a LabelSet 215, may change a LabelSet version, and multiple versions may be maintained.

A Task Definition 220 (i.e., a description of a ML task that a ML model is to accomplish) may encapsulate a data contract that specifies input and output data types. The Task Definition 220 may take the form of a .json file. An input datatype of a Task Definition 220 may indicate a compatible type of file (e.g., infrastructure model, image, video, etc.), and additional parameters (e.g., extensions, dimensions, file sizes, numbers of channels, etc.). An output datatype of the Task Definition 220 may indicate a compatible type of file (e.g., structured data, image, etc.), and additional parameters (e.g., a scope for the prediction, a schema for the file, etc.). A Task Definition 220 may reference a default ClassSet 225, or when changes have been made thereto, a user-defined ClassSet 225.

A ClassSet 225 (i.e., a data structure that maintains a collection of classes that can be predicted by a ML model) may contain individual classes. A ClassSet may be platform defined (i.e., a default ClassSet) or user-defined (e.g., from scratch or by adding, subtracting, or rearranging classes of an existing ClassSet, such as a default ClassSet). In some cases, a ClassSet 225 may be defined at least in part based on a query (e.g., an ECSQL query) that extracts classes from existing data. A ClassSet 225 is typically used with a single Task Definition 220. Each class contained in a ClassSet 225 may represent an individual class to be predicted by a ML model. Classes may be hierarchical arranged (e.g., each having zero or one parent). Each class may also contain properties representing class-specific information that an ML model is asked to predict. For example, a "Beam" class may have a "profile property" while a "Door" class may have a "fire rating" property. Properties of a class may be inherited by its children in the class hierarchy. Parents class may have a property that specifies that they are just a grouping class for inherited properties that the model cannot or should not predict.

DataSets 205 and ClassSets 225 may be modified over time. To keep a record of their state when consumed, a DataSet Snapshot 230 (i.e., a fixed-in-time representation of a DataSet) and a ClassSet Snapshot 235 (i.e., a fixed-in-time representation of a ClassSet) may be employed. A label file 217 may refer to a ClassSet Snapshot 235 to ensure compatibility. The labeling tool 140 may convert a label file 217 from one ClassSet Snapshot 235 to another by handling conflicts that may arise (e.g., if a class is deleted, deleting elements labeled by the class or converting them to another class).

A Training Pipeline 240 (i.e., an executable workflow whose execution produces a trained ML model for a Task Definition) may perform ML model training according to a referenced Task Definition 220 using a DataSet Snapshot 230. A Training Pipeline 240 may be one of several types that each perform a different type of training. A first type of Training Pipeline 240 may train a ML model from scratch. A second type of Training Pipeline 240 may retrain a base ML model to specialize the ML model. A third type of Training Pipeline 240 may train a ML model using transfer leaning from a base ML model. Each type of Training Pipeline 240 may have multiple versions. An execution of a Training Pipeline 240 according to a particular version (a Training Pipeline Run 245), may reference a Dataset 230 and produce a trained ML model whose parameters may be maintained in a Model Artifact 250. In cases where retraining/transfer learning are being performed, the Training Pipeline Run 245 may also reference the base ML model that is the starting point for the retraining or the source of the transfer learning. A Training Pipeline Run 245 may be associated with an evaluation metric that scores its effectiveness and allows comparison of the resulting trained ML model to other ML models.

An Inference Pipeline 255 may use a trained ML model according to a Task Definition 220 to perform inference. An Inference Pipeline 255 may have multiple versions. An execution of the Inference Pipeline 255 according to a particular version (an Inference Pipeline Run 260) may consume a Model Artifact 250 that describes the trained ML model. An Inference Pipeline Run 260 may produce a Review Set 265.

A Review Set 265 (i.e., a data structure that maintains data produced by a trained ML model in inference) may contain a collection of prediction files 267, which are files or other data that include predicted classes for elements and confidences in such predictions. The prediction files 267 may be mapped in various manners to the source data.

Figure 3:
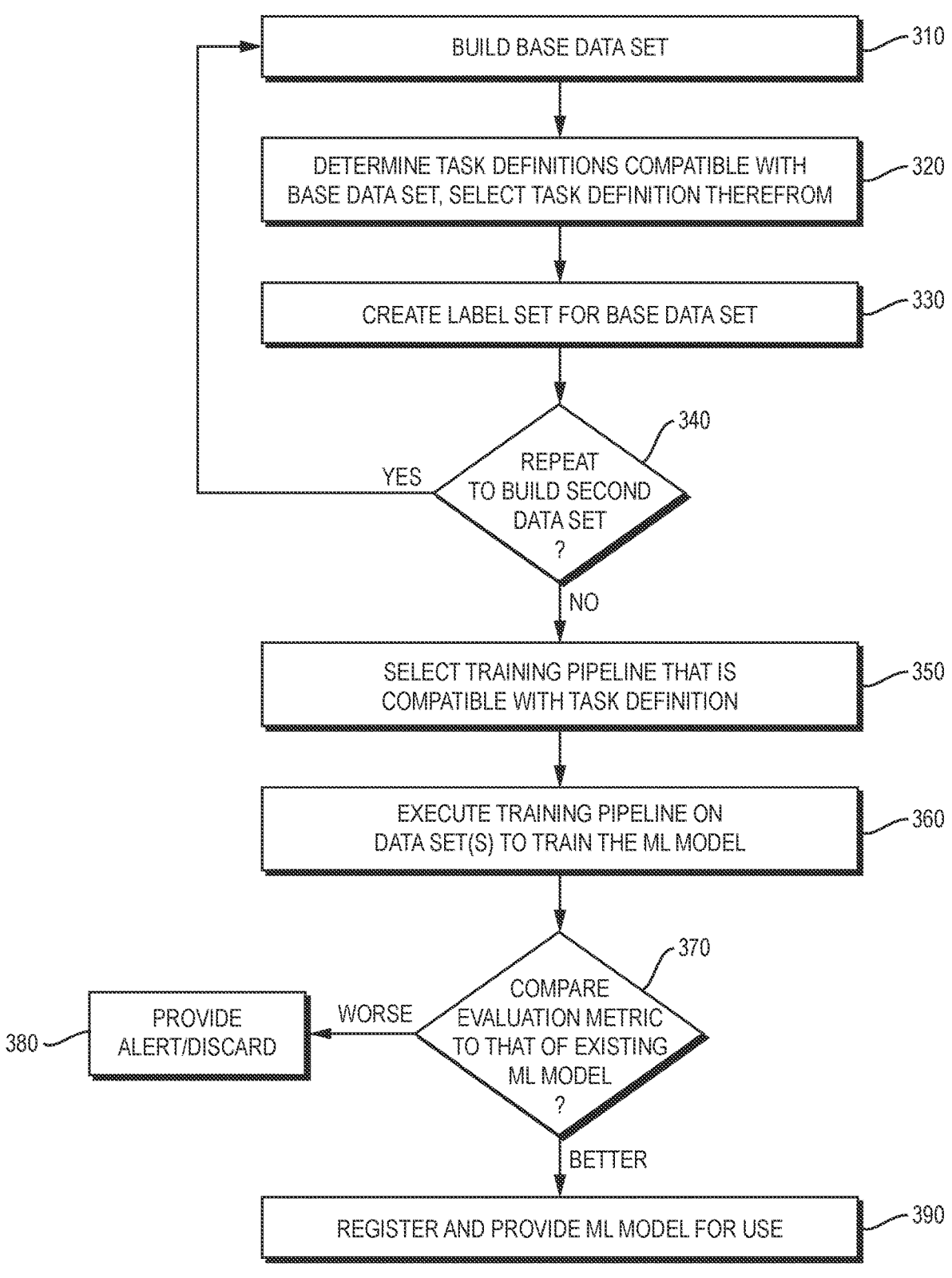
FIG. 3 is a flow diagram of a sequence of steps that may be performed to customize a ML model for a specific user absent user-coding using the entities from FIG. 2.

FIG. 3 is a flow diagram of a sequence of steps that may be performed to customize a ML model for a specific user absent user-coding using the entities from FIG. 2. At step

310, the ML platform 150 builds a BaseDataSet 210 in response to input in the user interface of the client 130. The input may take the form of a selection of a set of user files to upload to the ML platform 150 and/or a set of user files that are already resident in storage of the ML platform 150. Alternatively, the input may take the form of a selection of an existing BaseDataSet 210, and then new user files to add thereto, user files to delete therefrom, or contents of at least some user files to update.

At step 320, the ML Platform 150 determines one or more Task Definitions 220 whose input data type are compatible with the BaseDataSet 210, and selects one in response to user input in the user interface of the client 130. The ML Platform 150 may determine compatibility by matching an input datatype. Compatible Task Definitions 220 may be displayed in the user interface, and the user may indicate one to use. Selection of a Task Definition 220 may trigger the ML Platform 150 to create a new empty LabelSet 215 that may be populated with a set of LabelFiles in a later step.

In some implementations, as part of step 320, edits may also be made to the Task Definitions 220 to produce child Task Definitions to use. Existing Task Definitions 220 may be displayed in the user interface of the client 130, and a parent Task Definition to edit selected therefrom. In response to input in the user interface, changes may be made to the input datatype and/or output datatype, to any additional properties of the input datatype and/or output datatype, or to the ClassSet 225 referenced by the Task Definition 220. The changes to the ClassSet may involve manually adding or removing classes from an existing ClassSet and/or editing a query (e.g., an ECSQL query) used in creating the ClassSet.

At step 330, the ML Platform 150 creates a LabelSet 215 for the BaseDataSet by populating the empty LabelSet 215 produced in step 320 with label files 217. The ML Platform 150 may display in the user interface of the client 130 existing label files 217 and a user may select ones to include therefrom. Such existing label files 217 may be added without modification, or the labeling tool 140 used to edit the labels. The ML Platform 150 may also cause the client 130 to display an option to create a new label file 217, which triggers the labeling tool 140. The labeling tool 140 may permit creation of a new label file 217 by manual addition of labels or defining a query (e.g., an ECSQL query). More typically, however, creation of a new label file 217 may be "kickstarted" from a prediction file 267 of an existing ML model. Labels imported from the existing prediction file 267 may be added without modification, or the labeling tool 140 used to edit the labels.

In some implementations, as part of step 330, edits may also be made to the ClassSet 225 by the labeling tool 140. For example, a query (e.g., an ECSQL query) may be executed to create a new ClassSet 225 or labels manually added to or edited in the ClassSet 225. When changes are made to the ClassSet 225, the labeling tool 140 may be responsible for resolving any conflicts among label files 217 of the LabelSet 215 and to ensure they are all in synch. As mentioned above, each label file 217 references a ClassSet Snapshot 217. To be in synch each label file 217 should point to the same ClassSet Snapshot 217.

At optional step 340, the sequence of steps 310-330 are repeated to create a second Dataset 205.

At step 350, the ML platform 150 selects at least one DataSet 205 and a Training Pipeline 240 from among one or more Training Pipelines that are compatible with the Task Definition 205 of that DataSet(s) 205, based on input in the user interface of the client 130. The ML platform 150 may cause the display of available DataSets 205 and permit a user to indicate a first Dataset 205. If there are multiple available DataSets 205, the ML platform 150 may permit a user to, optionally, also indicate a second DataSet 205. When a single DataSet 205 is indicated, the ML Platform 150 may split the DataSet 205 into a training DataSet for use in training a ML model and a test DataSet for use in evaluating the ML model. Such splitting may be automatic, for example, using a data splitting algorithm (e.g., random, stratified sampling, etc.). When two DataSets 205 are chosen, one Dataset may be designated as the training DataSet and the other as the test DataSet.

After DataSet(s) 205 are selected, the ML platform 150 may cause the client 130 to display Training Pipelines 245 in the user interface that are compatible with the Task Definition 220. A Training Pipeline 245 is selected therefrom in response to user input. Compatible Training Pipelines 245 may reference the Task Definition 220 via a DataSet Snapshot 230. In cases where the Training Pipeline 245 retrains a base ML model or performs transfer learning using a base ML model, the ML platform 150 may cause the display of compatible base ML models. A base ML model may be selected therefrom in response to user input. For the case of transfer learning, the base ML model generally should differ only in ways the Training Pipelines 245 can handle. For example, a Training Pipelines 245 for transfer learning may allow adding new classes to the output, but not permit changing dimensions of the input.

At step 360, the ML platform 150 uses the MLOps process 160 to execute the selected Training Pipeline 245 on the DataSet(s) 205 to train the ML model for the data of the specific user. As discussed further below, in reference to FIGS. 4-6, the training may involve different operations depending on whether the training is for the case of a ML model from scratch, retraining an existing base ML model to specialize the base ML model, or training a ML model using transfer leaning from an existing base ML model. The MLOps process 160 may return both the trained ML model and an evaluation metric which may be used to evaluate the effectiveness of customization.

At step 370, the ML platform 150 compares the evaluation metric of the newly trained ML model to an existing ML model (which may be automatically selected or selected based on input from the user in the user interface of the client 130) to determine whether the trained ML model is better or worse (i.e., whether its evaluation metric is greater or less). In the case of the training being of a ML model from scratch, the evaluation metric may be compared with, for example, an evaluation metric of an existing generic ML model (e.g., one that uses the same Task Definition 205 but that was trained using generic reference data) and/or a previous attempt at training a customized ML model from scratch. In the case of retraining an existing base ML model to specialize the base ML model, the evaluation metric may be compared with, for example, an evaluation metric of the base ML model. In the case of performing transfer learning using an existing base ML model, the evaluation metric may be compared with, for example, an evaluation metric of the base ML model and/or a previous attempt at transfer learning from the base ML model.

At step 380, if the trained ML model is worse, the ML platform 150 provides an alert or other indication to the user in the user interface. In some cases, the trained ML model may then be discarded.

At step 390, if the trained ML model is better, the ML platform 150 registers the trained ML model and provides it for use as a customized ML model for the data and needs of the specific user. The trained ML model may be used in inference on new source data to predict classes of elements in such data. The trained ML model may also be used as a base model of retraining for specialization or as a source of transfer learning for training a ML model for the specific user. In some instances, if the trained ML model exhibits sufficient performance (e.g., as measured by evaluating it on a "gold-standard" generic evaluation DataSet), it may also be used to replace an existing generic ML model, and be provided for use by other users. Parameters of the trained ML model (e.g., the Model Artifact 250) may be maintained in storage of the ML Platform 150 and/or stored in other locations.

Figure 4:
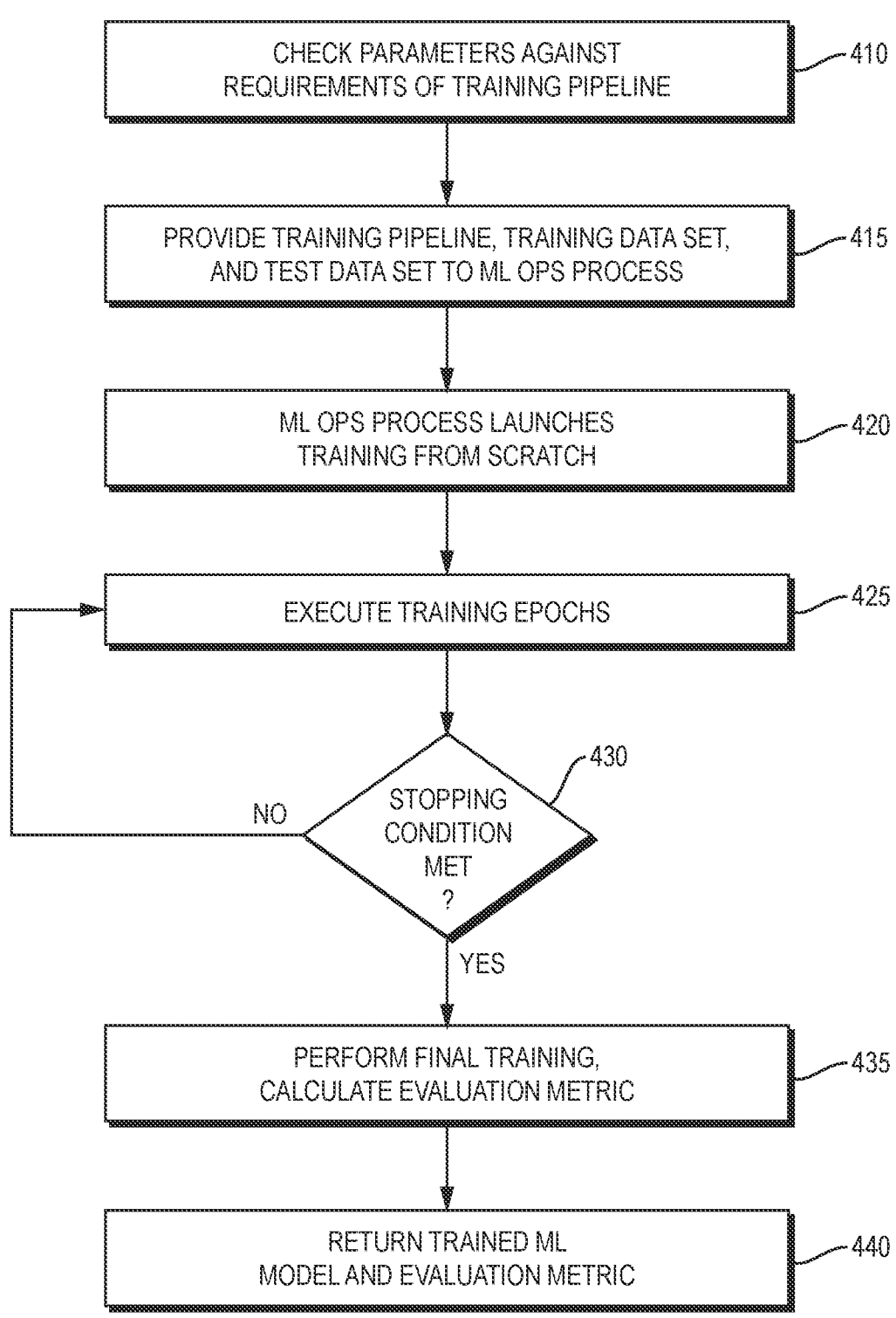
FIG. 4 is a flow diagram of an example sequence of steps that may be performed as part of FIG. 3 to execute a selected Training Pipeline on a DataSet to train a ML model from scratch.

FIG. 4 is a flow diagram of an example sequence of steps that may be performed as part of step 360 of FIG. 3 to execute a selected Training Pipeline on a DataSet 205 to train a ML model from scratch. At steps 410, the ML Platform 150 checks the parameters (e.g., size, distribution, etc.) of the training DataSet and the test DataSet against known requirements of the TrainingPipeline 245. If a DataSet fails the check, a warning may be issued and/or further execution prevented to avoid wasting computing resources. At step 415, the ML Platform 150 provides the Training Pipeline 245, training DataSet, and the test DataSet to the MLOps process 160. At step 420, the MLOps process 160 launches training from scratch. At step 425 the MLOps process 160 executes training epochs until a stopping condition is met (e.g., an evaluation metric reaches a threshold, a maximum number of epochs is reached, etc.) at step 430. In each epoch, the ML model is trained using the training DataSet and evaluated using the test DataSet. In some implementations, k-fold cross-validation may be utilized as part of step 425 and the MLOps process 160 may perform a number of fold runs and successively rebuild the training DataSet and the test DataSet for the next fold. Hyperparameter turning may also be performed during the training, updating the values of the hyperparameters used. At step 435, the MLOps process 160 may perform final training, optionally using a joint dataset that includes both the training DataSet and the test DataSet, and calculate an evaluation metric for the final training. At step 440, the MLOps process 160 returns the trained ML model and the evaluation metric to the ML Platform 150, where it may be registered for use (e.g., if it is better than an existing ML model).

Figure 5:
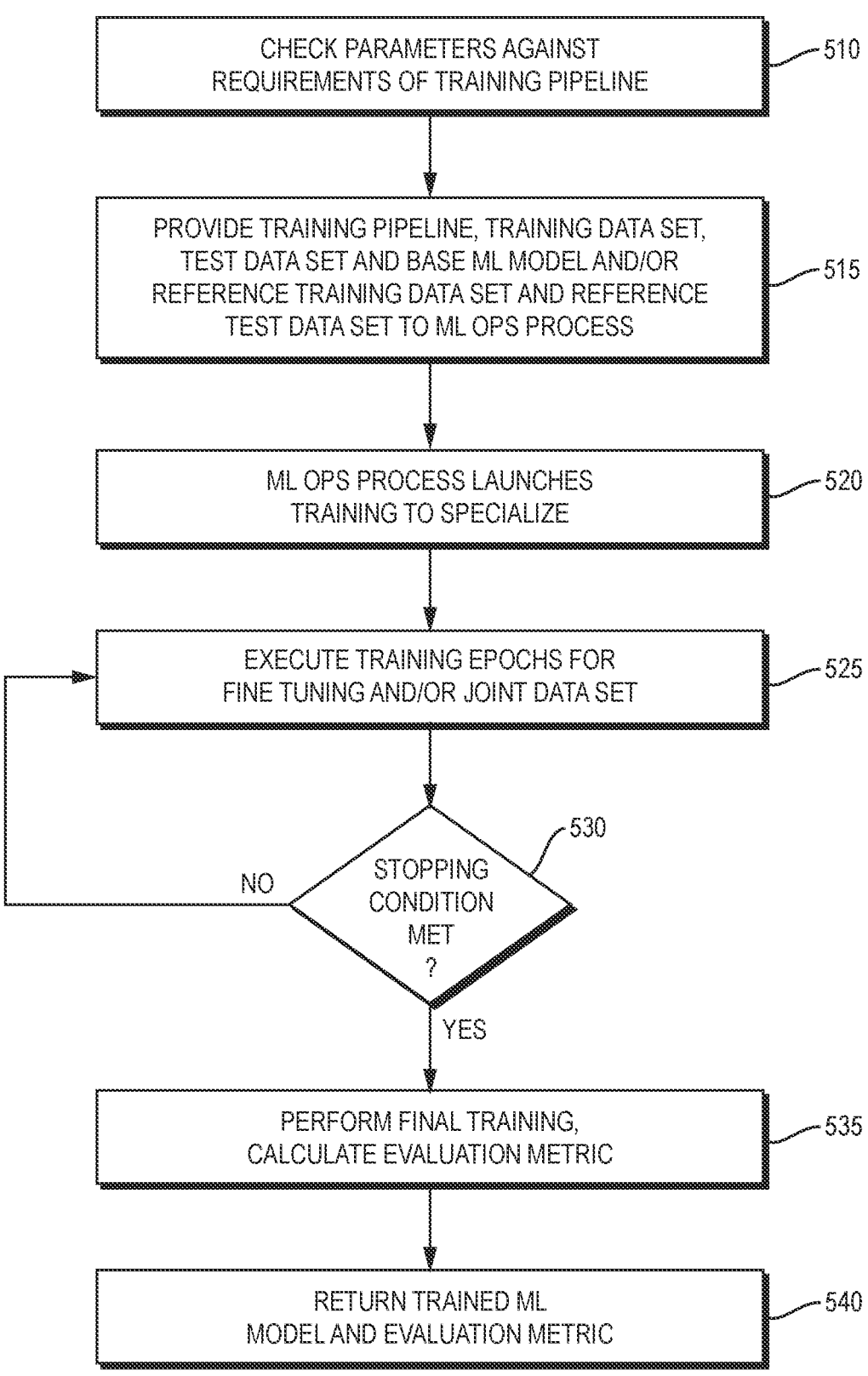
FIG. 5 is a flow diagram of an example sequence of steps that may be performed as part of FIG. 3 to execute a selected Training Pipeline to retrain a base ML model.

FIG. 5 is a flow diagram of an example sequence of steps that may be performed as part of step 360 of FIG. 3 to execute a selected Training Pipeline to retrain a base ML model. Retraining may involve a first case (referred to as "finetuning") in which training is continued by performing additional training epochs on the base ML model using the DataSet from the specific user and/or a second case (referred to as "joint dataset training") in which training uses a joint dataset that includes the DataSet from the specific user as well as a generic reference Dataset (e.g., a Dataset that was used to train the base ML model). The generic reference Dataset may be divided into a reference training DataSet and a reference test DataSet.

At step 510, the ML Platform 150 checks the parameters (e.g., size, distribution, etc.) of the training DataSet and the test DataSet against known requirements of the Training-Pipeline 245. If the DataSet 205 fails the check, a warning may be issued and/or further execution prevented to avoid wasting computing resources. At step 515, the ML Platform 150 provides the Training Pipeline, the training DataSet and test DataSet, and the base ML model and/or the reference training DataSet and reference test DataSet, to the MLOps process 160. At step 520, the MLOps process 160 launches retraining to specialize. When the training involves finetuning, at sub-step 522, the MLOps process 160 may utilize weights from the base ML model. In some implementations, to avoid overfitting, some data from the reference training DataSet may be sampled and injected into the training DataSet. When training involves joint dataset training, the MLOps process 160 may mix the reference training DataSet with the training DataSet to produce a joint training DataSet. The amount of training data coming from the reference training DataSet may be set as a hyperparameter. In some cases, a small amount of the reference training DataSet may be used simply to avoid overfitting on the training DataSet. The data coming from the reference training DataSet may be weighted or sampled in various ways, for example, to coincide with a data distribution of the training DataSet. If ClassSets differ between the training DataSet and reference training DataSet, class hierarchy may be used to lift ambiguities. For example, if a user splits a class found in the reference training DataSet in two or more child classes (i.e., sub-classes) in the training DataSet, training may only have the ML model predict one of the child classes for examples coming from the reference training DataSet, without back-propagating feedback on which child class should have been predicted (e.g., since this information may not be labeled).

At step 525, the MLOps process 160 executes training epochs until a stopping condition is met (e.g., an evaluation metric reaches a threshold, a maximum number of epochs is reached, etc.) at step 530. In the case of finetuning, in each epoch learning from the training DataSet updates weights of the base ML model. A low learning rate may be used so that the ML model does not entirely forget what it learned from its reference training DataSet. In the case of joint dataset training, the ML model learns from the joint training DataSet. Learning may be evaluated using the joint test DataSet. In some implementations, k-fold cross-validation may be utilized as part of step 525 and the MLOps process 160 may perform a number of fold runs and successively rebuild the joint training DataSet and the joint test DataSet for the next fold. Hyperparameter turning may also be performed periodically during the training, updating the values of the hyperparameters used. At step 535 the MLOps process 160 may perform final training, for example, using a joint dataset. In the case of finetuning, the joint dataset may include both the training DataSet and the test DataSet. In the case of joint DataSet training, the joint DataSet may include both the joint training DataSet and the joint test DataSet. In addition to producing an evaluation metric using the test DataSet or joint test DataSet, as part of step 535 the MLOps process 160 may calculate an evaluation metric on just the reference test DataSet. At step 540, the MLOps process 160 returns the trained ML model and its evaluation metric(s) to the ML Platform 150. If the evaluation metric on the reference test DataSet is greater than for the base ML model the newly trained ML model may be used, for example, to replace the base ML model.

FIG. 6 is a flow diagram of an example sequence of steps that may be performed as part of step 260 of FIG. 3 to execute a selected Training Pipeline to train a ML model with transfer learning from a base ML model. Transfer learning may operate similar to specialization, using weights from a base ML Model and in some cases a joint DataSet. The difference may be in the architecture of the ML Model, which may be altered to permit learning from a base ML model that has a compatible, but not necessarily identical, architecture (e.g., to allow for new neurons associated with the prediction of newly added classes, new neurons to accept different dimension inputs, etc.)

At steps 610, the ML Platform 150 checks the parameters (e.g., size, distribution, etc.) of the training DataSet and the test DataSet against known requirements of the Training-Pipeline 245. If the DataSet 205 fails the check, a warning may be issued and/or further execution prevented to avoid wasting computing resources. At step 615, the ML Platform 150 provides the Training Pipeline, training DataSet and test DataSet, the base ML model, and, in some cases, the reference training DataSet and reference test DataSet, to the MLOps process 160. At step 620, the MLOps process 160 launches training using transfer learning. The MLOps process 160 may load weights from the base ML model that is the source for transfer leaning. The MLOps process 160 may use the training DataSet, or in some cases a joint DataSet that combines the training DataSet and the reference training DataSet, for training. Sometimes it may not be possible to create a joint dataset (e.g., because the input and output formats are different). At step 625, the MLOps process 160 executes training epochs until a stopping condition is met (e.g., an evaluation metric reaches a threshold, a maximum number of epochs is reached, etc.) at step 630. Learning may be evaluated using the testing DataSet or joint test DataSet. Hyperparameter tuning may also be performed periodically during the training, updating the values of the hyperparameters used. Initially, the weights of the first layers of the ML model may be frozen and the final layer updated (e.g., to add new classes). Subsequently, the weights of the first layers of the ML model may be unfrozen to allow some tuning (e.g., if a joint training DataSet is used). At step 635, the MLOps process 160 may perform final training, for example, using both the training DataSet and the test DataSet or both the joint training DataSet and the joint test DataSet. In addition to producing an evaluation metric using the test DataSet or joint test DataSet, as part of step 635 the MLOps process 160 may calculate an evaluation metric on just the reference test DataSet. At step 640, the MLOps process 160 returns the trained ML model and its evaluation metric(s) to the ML Platform 150. If the evaluation metric on the reference test DataSet is greater than for the base ML model the newly trained ML model may be used, for example, to replace the base ML model.

In summary, the above description details example techniques for customizing a ML model for a specific user. It should be understood that various adaptations and modifications may be readily made from these techniques, to suit various implementations and environments. While it is discussed above that many aspects of the techniques are implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for customizing a machine learning (ML) model to detect a type of defect in infrastructure relevant to a specific user, comprising:

creating a DataSet, by a ML platform executing on one or more computing devices, for the specific user at least in part by building, by the ML platform, a BaseDataSet that includes at least an image, point cloud, a video, or a model of the infrastructure, determining, by the ML platform, one or more Task Definitions that are compatible with the BaseData-Set, wherein each Task Definition is a predefined description of a task related to infrastructure defect detection that an ML model may accomplish that specifies an input data type and an output data type, and one or more Task Definitions are considered compatible with the BaseDataSet based on a comparison by the ML platform of the input data type with a data type of the BaseDataSet, generating, by the ML Platform, a child Task Definition from the determined compatible Task Definitions, wherein the generating the child Task Definition includes adding or removing one or more classes from a ClassSet associated with a Task Definition based on input in the user interface;

selecting, by the ML platform, the child Task Definition based on input in the user interface, and creating, by the ML platform, a LabelSet for the BaseDataSet;

selecting, by the ML platform, a Training Pipeline from among a plurality of provided Training Pipelines that each perform a different type of training that is compatible with the Task Definition, wherein the selected Training Pipeline is a computing-device executable workflow for a type of training;

executing the selected Training Pipeline on the DataSet to train the ML model to detect the type of defect in infrastructure relevant to the specific user; and providing, by the ML Platform, the trained ML model for use by the specific user in detecting the type of defect in infrastructure.

2. The method of claim 1, further comprising:

comparing an evaluation metric of the trained ML model to an existing ML model, wherein the providing the trained ML model is in response to the evaluation metric of the trained ML model being greater than an evaluation metric of the existing ML model.

3. The method of claim 1, wherein the executing the selected Training Pipeline trains the ML model from scratch.

4. The method of claim 3, wherein the executing the selected Training Pipeline further comprises:

providing the Training Pipeline and the DataSet to a ML Operations (MLOps) process;

executing, by the MLOps process, training epochs until a stopping condition is met;

performing, by the MLOps process, final training to calculate an evaluation metric; and returning the ML model and the evaluation metric to the ML Platform.

5. The method of claim 1, wherein the executing the selected Training Pipeline comprises retraining an existing base ML model to specialize the base ML model.

6. The method of claim 5, wherein the retraining the base ML model comprises continuing training by performing additional training epochs on the base ML model using the DataSet.

7. The method of claim 5, wherein the retraining the base ML model comprises joint dataset training using a joint dataset that includes the DataSet as well as a generic reference Dataset used to train the base ML model.

8. The method of claim 5, wherein the executing the selected Training Pipeline further comprises:

providing the Training Pipeline, the DataSet, the base ML model and/or a reference Dataset to a ML Operations (MLOps) process;

executing, by the MLOps process, training epochs until a stopping condition is met, the training epochs using at least initially weights from the base ML model or a joint dataset that includes a mix of data from the DataSet and the reference training DataSet;

performing, by the MLOps process, final training to calculate an evaluation metric; and returning the ML model and the evaluation metric to the ML Platform.

9. The method of claim 1, wherein the executing the selected Training Pipeline performs transfer learning using a base ML model.

10. The method of claim 9, wherein the executing the selected Training Pipeline further comprises:

providing the Training Pipeline, the DataSet, and the base ML model to a ML Operations (MLOps) process;

executing, by the MLOps process, training epochs until a stopping condition is met, the training epochs using at least initially weights from the base ML model;

performing, by the MLOps process, final training to calculate an evaluation metric; and returning the ML model and the evaluation metric to the ML Platform.

11. A method for customizing a machine learning (ML) model to detect a type of defect in infrastructure relevant to for a specific user, comprising:

creating data usable to train a ML model for the specific user by a ML platform executing on one or more computing devices, at least in part by building, by the ML Platform, a data structure that maintains a collection of source data of the user that includes at least an image, point cloud, a video, or a model of the infrastructure, determining, by the ML Platform, one or more descriptions of a ML task related to infrastructure defect detection that a ML model is to accomplish that are compatible with the collection of source data, wherein each description describes a task an ML model may accomplish and specifies an input data type and an output data type, wherein one or more descriptions are considered compatible with the collection of source data based on a comparison by the ML platform of the input data type with a data type of the collection of source data, selecting, by the ML platform, a description from the determined compatible descriptions, and creating, by the ML platform, a structure that maintains a collection of labels for source data that provides ground truth that is compatible with the description;

selecting, by the ML platform, an executable workflow whose execution produces a trained ML model from among a plurality of provided executable workflows that each perform a different type of training that are compatible with the description;

executing the selected executable workflow on the source data to train the ML model to detect the type of defect in infrastructure relevant to the specific user; and providing, by the ML Platform, the trained ML model for use by the specific user in detecting the type of defect in infrastructure, wherein the creating, executing, and providing are performed without user-coding to customize the ML model.

12. The method of claim 11, further comprising:

comparing an evaluation metric of the trained ML model to an existing ML model, wherein the providing the trained ML model is in response to the evaluation metric of the trained ML model being greater than an evaluation metric of the existing ML model.

13. The method of claim 11, wherein the executing the selected executable workflow trains the ML model from scratch.

14. The method of claim 11, wherein the executing the selected executable workflow comprises retraining an existing base ML model to specialize the base ML model.

15. The method of claim 14, wherein the retraining the base ML model comprises continuing training by performing additional training epochs on the base ML model using the data for the specific user.

16. The method of claim 14, wherein the retraining the base ML model comprises joint dataset training using a joint dataset that includes the data for the specific user as well as generic reference data used to train the base ML model.

17. The method of claim 11, wherein the executing the selected Training Pipeline performs transfer learning using a base ML model.

18. A non-transitory computing device readable medium having instructions stored thereon, the instructions when executed by one or more computing devices operable to:

create a DataSet for a specific user at least in part by
    building a BaseDataSet that includes at least an image, point cloud, a video, or a model of the infrastructure,
    determining one or more Task Definitions that are compatible with the BaseDataSet, wherein each Task Definition is a predefined description of a task related to infrastructure defect detection that an ML model may accomplish that specifies an input data type and an output data type, and one or more Task Definitions are considered compatible with the Base- DataSet based on a comparison by the ML platform of the input data type with a data type of the BaseDataSet, generating a child Task Definition from the determined compatible Task Definitions, wherein the generating the child Task Definition includes adding or removing one or more classes from a ClassSet associated with a Task Definition based on input in the user interface;

selecting the child Task Definition based on input in the user interface, and creating a LabelSet for the BaseDataSet;

select a Training Pipeline from among a plurality of provided Training Pipelines that each perform a different type of training that is compatible with the Task Definition, wherein the selected Training Pipeline is a computing-device executable workflow for a type of training;

execute the selected Training Pipeline on the DataSet to train the ML model to detect a type of defect in infrastructure relevant to the specific user; and provide the trained ML model for use by the specific user in detecting the type of defect in infrastructure.

19. The non-transitory electronic-device readable medium of claim 18, wherein the instructions that when executed are operable to execute the selected Training Pipeline comprises instructions that when executed are operable to retrain an existing base ML model to specialize the base ML model.

20. The non-transitory electronic-device readable medium of claim 18, wherein the instructions that when executed are operable to execute the selected Training Pipeline comprises instructions that when executed are operable to perform transfer learning using a base ML model.

* * * * *